US008697288B2

(12) United States Patent
Buckley et al.

(10) Patent No.: US 8,697,288 B2
(45) Date of Patent: *Apr. 15, 2014

(54) HIGH ENERGY LITHIUM ION SECONDARY BATTERIES

(75) Inventors: James P. Buckley, San Jose, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 13/479,555

(22) Filed: May 24, 2012

(65) Prior Publication Data

US 2012/0263987 A1     Oct. 18, 2012

Related U.S. Application Data

(63) Continuation of application No. 12/403,521, filed on Mar. 13, 2009, now Pat. No. 8,187,752.

(60) Provisional application No. 61/124,407, filed on Apr. 16, 2008.

(51) Int. Cl.
*H01M 4/13*     (2010.01)
*H01M 4/58*     (2010.01)
*H01M 4/62*     (2006.01)
*H01M 4/00*     (2006.01)
*H01M 4/50*     (2010.01)

(52) U.S. Cl.
USPC ...... 429/231.95; 429/217; 429/223; 429/224; 429/231.3; 429/232

(58) Field of Classification Search
USPC .............. 429/209, 232, 217, 223, 224, 231.3, 429/231.95
See application file for complete search history.

(56) References Cited

U.S. PATENT DOCUMENTS

| 5,514,488 A | 5/1996 | Hake et al. |
|---|---|---|
| 6,080,507 A | 6/2000 | Yu |
| 6,171,723 B1 | 1/2001 | Loch et al. |

(Continued)

FOREIGN PATENT DOCUMENTS

| CN | 1945881 A | 4/2007 |
|---|---|---|
| CN | 1949579 A | 4/2007 |

(Continued)

OTHER PUBLICATIONS

Kang et al., "Enchanting the rate capability of high capacity xLi2MnO3 . (1-x)LiMO2 (M=Mn, Ni, Co) electrodes by Li-Ni-PO4 treatment," Electrochemistry Communications 11 (2009) 748-751.

(Continued)

*Primary Examiner* — Eli Mekhlin
(74) *Attorney, Agent, or Firm* — Dardi & Herbert, PLLC; Peter S. Dardi

(57) ABSTRACT

Lithium ion secondary batteries are described that have high total energy, energy density and specific discharge capacity upon cycling at room temperature and at a moderate discharge rate. The improved batteries are based on high loading of positive electrode materials with high energy capacity. This capability is accomplished through the development of positive electrode active materials with very high specific energy capacity that can be loaded at high density into electrodes without sacrificing performance. The high loading of the positive electrode materials in the batteries are facilitated through using a polymer binder that has an average molecular weight higher than 800,000 atomic mass unit.

19 Claims, 5 Drawing Sheets

(56) References Cited

U.S. PATENT DOCUMENTS

| | | |
|---|---|---|
| 6,235,427 B1 | 5/2001 | Idota et al. |
| 6,251,822 B1 | 6/2001 | Peng et al. |
| 6,337,156 B1 | 1/2002 | Narang et al. |
| 6,383,687 B1 | 5/2002 | Gibbons et al. |
| 6,420,071 B1 | 7/2002 | Lee et al. |
| 6,511,767 B1 | 1/2003 | Calver et al. |
| 6,528,208 B1 | 3/2003 | Thackeray et al. |
| 6,616,715 B2 | 9/2003 | Kitoh et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,730,429 B2 | 5/2004 | Thackeray et al. |
| 6,749,648 B1 | 6/2004 | Kumar et al. |
| 6,783,896 B2 | 8/2004 | Tsujioka et al. |
| 6,787,267 B2 | 9/2004 | Tsujioka et al. |
| 6,787,268 B2 | 9/2004 | Koike et al. |
| 6,855,460 B2 | 2/2005 | Vaughey et al. |
| 6,884,546 B1 | 4/2005 | Fujita et al. |
| 6,936,382 B2 | 8/2005 | Mikhaylik et al. |
| 6,951,699 B2 | 10/2005 | Yata et al. |
| 6,964,828 B2 | 11/2005 | Lu et al. |
| 7,026,074 B2 | 4/2006 | Chen et al. |
| 7,033,702 B2 | 4/2006 | Dasgupta et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,186,479 B2 | 3/2007 | Krasnov et al. |
| 7,198,869 B2 | 4/2007 | Ghantous et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,214,446 B1 | 5/2007 | Bi et al. |
| 7,229,717 B2 | 6/2007 | Yamaguchi et al. |
| 7,235,330 B1 | 6/2007 | Fujimoto et al. |
| 7,252,907 B2 | 8/2007 | Takeuchi et al. |
| 7,273,682 B2 | 9/2007 | Park et al. |
| 7,338,734 B2 | 3/2008 | Chiang et al. |
| 7,351,494 B2 | 4/2008 | Hennige et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,497,285 B1 | 3/2009 | Radev |
| 7,507,503 B2 | 3/2009 | Amine et al. |
| 7,510,803 B2 | 3/2009 | Adachi et al. |
| 7,544,443 B2 | 6/2009 | Fujihara et al. |
| 7,718,306 B2 | 5/2010 | Cheon et al. |
| 2002/0122973 A1 | 9/2002 | Manev et al. |
| 2003/0087155 A1 | 5/2003 | Cho et al. |
| 2003/0157014 A1 | 8/2003 | Wang et al. |
| 2004/0038125 A1 | 2/2004 | Kim et al. |
| 2004/0072072 A1 | 4/2004 | Suzuki et al. |
| 2004/0151951 A1 | 8/2004 | Hyung et al. |
| 2004/0161669 A1 | 8/2004 | Zolotnik et al. |
| 2004/0191630 A1 | 9/2004 | Kawamura et al. |
| 2005/0019670 A1 | 1/2005 | Amine et al. |
| 2005/0026037 A1 | 2/2005 | Riley, Jr. et al. |
| 2005/0031942 A1 | 2/2005 | Hennige et al. |
| 2005/0202316 A1 | 9/2005 | Hwang et al. |
| 2006/0051671 A1 | 3/2006 | Thackeray et al. |
| 2006/0051673 A1 | 3/2006 | Johnson et al. |
| 2006/0068293 A1 | 3/2006 | Kim et al. |
| 2006/0099472 A1 | 5/2006 | Hsu |
| 2006/0147809 A1 | 7/2006 | Amine et al. |
| 2006/0197496 A1 | 9/2006 | Iijima et al. |
| 2006/0269834 A1 | 11/2006 | West et al. |
| 2006/0286438 A1 | 12/2006 | Fujikawa et al. |
| 2007/0072080 A1 | 3/2007 | Inagaki et al. |
| 2007/0148544 A1 | 6/2007 | Le |
| 2007/0231702 A1 * | 10/2007 | Fujita et al. .................. 429/247 |
| 2008/0008933 A1 | 1/2008 | Lampe-Onnerud |
| 2008/0026297 A1 | 1/2008 | Chen et al. |
| 2008/0070122 A1 | 3/2008 | Park et al. |
| 2008/0261115 A1 | 10/2008 | Saito et al. |
| 2008/0318122 A1 | 12/2008 | Sun |
| 2009/0092900 A1 | 4/2009 | Obana et al. |
| 2009/0253042 A1 | 10/2009 | Sun et al. |
| 2009/0263707 A1 | 10/2009 | Buckley et al. |
| 2009/0263721 A1 | 10/2009 | Haruna et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |

FOREIGN PATENT DOCUMENTS

| | | |
|---|---|---|
| JP | 07-065825 | 3/1995 |
| JP | 09-045373 | 2/1997 |
| JP | 10-255837 | 9/1998 |
| JP | 2000-012018 | 1/2000 |
| JP | 2002-110167 | 4/2002 |
| JP | 2003-242978 A | 8/2003 |
| JP | 2003223887 A * | 8/2003 |
| JP | 2004-356004 A | 12/2004 |
| JP | 2005-251684 A | 9/2005 |
| JP | 2006-139968 A | 6/2006 |
| JP | 2007-066667 A | 3/2007 |
| JP | 2008-501220 A | 1/2008 |
| JP | 2008-078139 A | 4/2008 |
| KR | 10-2001-0043360 | 5/2001 |
| KR | 10-2003-0007651 | 1/2003 |
| KR | 10-2005-0111764 | 11/2005 |
| KR | 10-0578877 | 5/2006 |
| KR | 10-0684724 | 2/2007 |
| WO | 01/35473 A1 | 5/2001 |
| WO | 01/91209 A1 | 11/2001 |
| WO | 03/021697 A2 | 3/2003 |
| WO | 2004/084330 A2 | 9/2004 |
| WO | 2005/083829 A2 | 9/2005 |
| WO | 2006/109930 A1 | 10/2006 |
| WO | 2006/137673 A1 | 12/2006 |
| WO | 2007/083405 A1 | 7/2007 |
| WO | 2008/086041 A1 | 7/2008 |
| WO | 2009/022848 A1 | 2/2009 |

OTHER PUBLICATIONS

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Lee et al., "High capacity Li[Li0.2Ni0.2Mn0.6]O2 cathode materials via a carbonate co-precipitation method," J. of Power Sources, 162 (2006), 1346-1350.

Park et al., "Physical and electrochemical properties of spherical Li1+x(Ni1/3Co1/3Mn1/3)1-xO2 cathode materials", Journal of Power Sources, 177:177-183 (2008).

Song et al., Two-and three-electrode impedance spectroscopy of lithium-ion batteries, Journal of Power Sources 111 (2002) 255-267.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "Significant Improvement of high voltage cycling behavior AlF3-coated LiCoO2 cathode," Electrochemistry Communications 8 (2006) 821-826.

(56) References Cited

OTHER PUBLICATIONS

Sun et al., "The preparation and electrochemical performance of solid solutions LiCoO2-Li2MnO3 as cathode materials for lithium ion batteries," J of Power Sources 159 (2006) 1353-1359.

Thackeray et al., "Li2MnO3-stabilized LiMO2 (M=Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn, Ni, Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Evonik Separion 2009, "Scientific breakthrough: SEPARION® opens up new markets for lithium ion batteries," http://corporate.evonik.de/en/company/news/lithium_ion_batteries/Pages/separion.aspx.

"Battery Test Manual for Plug-In Hybrid Elelctric Vehicles," prepared for the U.S. Department of Energy, Office of Energy Efficiency and Renewable Energy, Vehicle Technologies Program, 2008.

International Search Report PCT/US2009/002206 (mailing date Nov. 30, 2009) of US counterpart U.S. Appl. No. 12/403,521.

Office Action for corresponding Chinese Patent Application No. 200980118046.0, mailed Nov. 1, 2012.

Office Action for corresponding Japanese Patent Application No. 2011-505000, dated Sep. 3, 2013.

\* cited by examiner

HIGH ENERGY LITHIUM ION SECONDARY BATTERIES

CROSS REFERENCE TO RELATED APPLICATIONS

This patent application is a continuation of U.S. patent application Ser. No. 12/403,521 filed on Mar. 13, 2009, now U.S. Pat. No. 8,187,752 to Buckley et al., entitled "High Energy Lithium Ion Secondary Batteries," which claims priority to U.S. provisional patent application Ser. No. 61/124,407 filed on Apr. 16, 2008 to Buckley et al., entitled "High Energy Lithium Ion Secondary Batteries," both of which are incorporated herein by reference.

FIELD OF THE INVENTION

The invention relates to lithium ion secondary batteries with high energy positive electrode materials in battery configurations that provide for particularly high discharge energy densities for the resulting batteries. The invention also relates to methods for forming the high energy lithium ion secondary batteries.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that intercalates lithium. For some current commercial batteries, the negative electrode material can be graphite, and the positive electrode material can comprise lithium cobalt oxide ($LiCoO_2$). In practice, only roughly 50% of the theoretical capacity of the cathode can be used, e.g., roughly 140 milliamp hours per gram (mAh/g). At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles. However, by design, these battery cells are lower in energy since a design providing for high current generally reduces total energy that can be delivered from the cell. The second design category involves high energy cells, whereby lithium ion battery cells are designed to delivery low to moderate current (Amperes) for such applications as cellular phones, lap-top computers, Electric vehicles (EVs) and Plug in Hybrid electric vehicles (PHEVs) with the delivery of higher total energy.

SUMMARY OF THE INVENTION

In a first aspect, the invention pertains to a lithium ion secondary battery comprising a positive electrode that comprises a positive electrode active material and a binder, a negative electrode that comprises a first lithium intercalating composition, an electrolyte that comprises lithium ions, and a separator between the positive electrode and the negative electrode. In some embodiments, the battery has a discharge energy density of at least about 240 Wh/kg when discharged from 4.6V to 2.0V. The positive electrode active material of the positive electrode of the battery comprises a second lithium intercalation composition. The positive electrode of the battery can comprise at least about 92 weight percent of the positive electrode active material. The positive electrode active material comprising the second lithium intercalation composition that is represented by a formula of $xLiMO_2 \cdot (1-x)Li_2M'O_3$ where M is one or more trivalent metal ion with at least one metal ion being $Mn^{+3}$, $Co^{+3}$, or $Ni^{+3}$ and M' represents one or more metal ions having an average valance of +4 and $0<x<1$. In some embodiments, the second lithium intercalation composition can further comprise from about 0.1 mole percent to about 10 mole percent metal fluoride as a coating. In additional embodiments, the positive electrode of the battery can comprise from about 0.1 to 5 weight percent electrically conductive agents and about 0.5 to 7.9 weight percent polymer binder that are distinct from the second lithium intercalation composition. The binder can comprise a polymer having an average molecular weight of at least about 800,000 atomic mass unit. In some embodiments, the negative electrode of the battery has a thickness from about 65 microns to about 200 microns on a single side of a current collector. In further embodiments, the battery can have a discharge energy density of at least about 250 Wh/kg to 550 Wh/kg. The battery can have a volumetric discharge energy density of at least about 550 Wh/l.

In a second aspect, the invention pertains to a lithium ion secondary battery comprising a positive electrode, a negative electrode comprising a first lithium intercalating composition, and a separator between the positive electrode and the negative electrode where the positive electrode comprises at least about 92 weight percent positive electrode active material, about 0.1 to 5 weight percent electrically conductive agents, and about 0.5 to 7.9 weight percent a polymer binder. In some embodiments, the positive electrode active material of the battery comprises a second lithium intercalation composition represented by a formula $xLiMO_2 \cdot (1-x)Li_2M'O_3$ where M is one or more trivalent metal ion with at least one metal ion being $Mn^{+3}$, $Co^{+3}$, or $Ni^{+3}$ and M' represents one or more metal ions having an average valance of +4 and $0<x<1$. An optional fluorine dopant can optionally replace up to about 1 atomic percent of the oxygen in the formula of the second lithium intercalation composition. The positive electrode of the battery has a density of at least about 2.5 g/mL In some other embodiments, the second lithium intercalation composition is represented by a formula $Li_{1+x}Ni_\alpha Mn_\beta Co_\gamma O_2$, where x ranges from about 0.05 to about 0.25, α ranges from about 0.1 to about 0.4, β ranges from about 0.4 to about 0.65, and γ ranges from about 0.05 to about 0.3. In some embodiments, the positive electrode material can further comprise from about 1.0 mole percent to about 10 mole percent metal fluoride as a coating. In one embodiment, the metal fluoride coating comprises $AlF_3$. In some embodiments, the second lithium intercalation composition of the positive electrode active material is represented by a formula $Li_{1+x}Ni_\alpha Mn_\beta Co_\gamma M''_\delta O_{2-z/2}F_z$, where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1, and where M" is Mg, Zn, Al, Ga, B, Zr, Ti, Ca, Ce, Y, Nb or combinations thereof. The negative electrode of the battery can comprise graphite, synthetic graphite, hard carbon, graphite coated metal foil, coke or a combination thereof. In some embodiments, the separator of the battery comprises polyethylene, polypropylene, ceramic-polymer composites, or a combination thereof. In particular, the separator can comprise a polyethylene-polypropylene-polyethylene trilayer membrane. Also, the electrically conductive material of the positive electrode can comprise graphite, carbon black, metal powders, metal fibers, or a combination thereof. In some embodiments, the polymer binder of the positive electrode can comprise polyvinylidine fluoride (PVDF), polyethylene oxide, polyethylene, polypropylene, polytetrafluoroethylene, polyacrylates, ethylene-(propylene-diene monomer) copolymer (EPDM) and mixtures and copolymers thereof. With respect to the structure, the battery can comprise a plurality of electrodes with each polarity separated by separators within a casing. In some embodiments, the electrodes and separators of the battery can be stacked, jelly-rolled, or folded inside the casing. In general, the casing of the battery comprises a polymeric film, a metallic foil, a metal can, or a combination thereof. For example, the casing of the battery can be prismatic in shape or cylindrical in shape. In some embodiments, the battery described herein has a discharge energy density of at least about 250 Wh/kg when discharged from 4.6V to 2.0V.

In a third aspect, the invention pertains to a method for forming a lithium ion secondary battery. The method comprises assembling a positive electrode, a negative electrode, and a separator to form the battery that has a discharge energy density of at least about 240 Wh/kg. The separator is sandwiched between the positive electrode and the negative electrode of the battery and the positive electrode comprises a binder and a positive electrode active material comprising a lithium intercalation composition. The density of the positive electrode is at least about 2.5 grams per milliliter (g/mL). In some embodiments, the positive electrode of the battery is fainted by coating the positive electrode active material with the binder onto a current collector. The positive electrode can comprise at least about 92 weight percent of positive electrode active material where the lithium intercalation composition is represented by a formula of $xLiMO_2 \cdot (1-x)Li_2M'O_3$ where M is one or more trivalent metal ion with at least one metal ion being $Mn^{+3}$, $Co^{+3}$, or $Ni^{+3}$ and M' represents one or more metal ions having an average valance of +4 and $0<x<1$. The current collector of the positive electrode of the battery can comprise a metal foil, a metal grid, expanded metal, or metal foam. In further embodiments, the current collector of the positive electrode of the battery comprises nickel, aluminum, stainless steel, copper or a combination thereof. In some embodiments, the positive electrode of the battery further comprises from about 0.1 to 5 weight percent electrically conductive agents, and/or from about 0.5 to 7.9 weight percent polymer binder. The binder of the positive electrode of the battery can comprise a polymer having an average molecular weight of at least about 800,000 atomic mass unit. In additional embodiments, the negative electrode has a thickness from about 65 microns to about 200 microns on a single side of a current collector. In some embodiments, the battery has a discharge energy density of at least about 250 Wh/kg when discharged from 4.6V to 2.0V.

In a fourth aspect, the invention pertains to a lithium ion secondary battery that comprises a positive electrode, a negative electrode comprising a first lithium intercalating composition, and a separator between the positive electrode and the negative electrode. The positive electrode can comprise at least about 92 weight percent positive electrode active material, about 0.1 to 5 weight percent electrically conductive agents, and about 0.5 to 7.9 weight percent polymer binder comprising PVDF that has an average molecular weight of at least about 800,000 atomic mass unit.

DETAILED DESCRIPTION OF THE INVENTION

Figure 1:
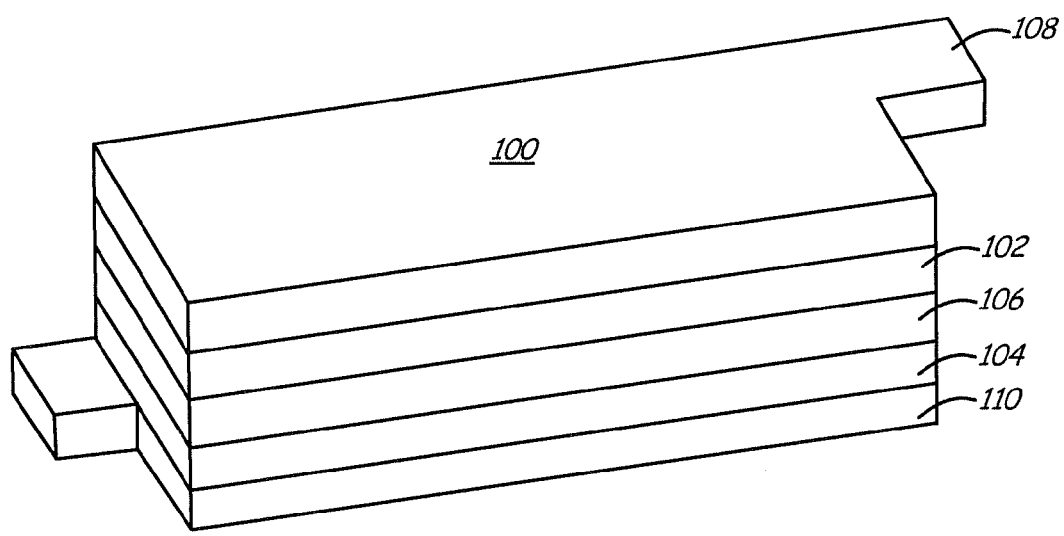
FIG. 1 is a schematic drawing of a battery structure separated from a container.

Lithium ion batteries with designs described herein exhibit extremely high total energy as well as energy density, which are particularly suitable for low to medium rate applications. These batteries also have good cycling properties such that the high energy values can be used advantageously over a significant period of time. The improved batteries are based in part on positive electrode materials with high energy capacity. Battery designs described herein provide for advantageously using these high energy capacity positive electrode materials to achieve the extremely high energies described herein. Specifically, the battery designs can involve very high loadings of positive electrode active materials. The development of synthesis approaches that achieve positive electrode active materials that have a high tap density provides appropriate materials for achieving the high loadings described herein for the positive electrodes. In addition, the very high loading of the positive electrode active materials can be further facilitated in some embodiments at least in part through the use of a polymer binder with a molecular weight of at least about 800,000 AMU. Corresponding methods to form the battery cells are described. Furthermore, the positive electrode active materials can be coated, doped or a combination thereof with an inorganic fluoride composition to improve the cycling properties of the cells at a high energy density. In particular, the inorganic coatings that provide improved cycling performance can also improve or at least not significantly diminish the overall energy density of the positive electroactive materials even though the weight of the coating does not directly contribute to the capacity.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation or similar mechanisms. Desirable mixed metal oxides are described further herein to function as electroactive materials for positive electrodes in secondary lithium ion batteries. Lithium ion batteries refer to batteries in which the negative electrode active material is also a lithium intercalation material. If lithium metal itself is used as the anode or negative electroactive material, the resulting battery generally is simply referred to as a lithium battery.

The positive electrode active materials used herein comprise lithium intercalating metal oxide compositions. In some embodiments, the lithium metal oxide compositions can comprise lithium rich compositions that generally are believed to form a layered composite structure. In some embodiments, the positive electrode of the battery can comprise at least about 92 weight percent of positive electrode active material, and the positive electrode active material can comprise a composition represented by a formula $xLiMO_2 \cdot (1-x)Li_2M'O_3$ where M is one or more trivalent metal ion with at least one metal ion being $Mn^{+3}$, $Co^{+3}$, or $Ni^{+3}$ and M' represents one or more metal ions having an average valance of +4 and $0<x<1$. This material can optionally have a fluorine dopant that substitutes for oxygen and/or about 0.1 mole percent to about 10 mole percent metal fluoride as a coating. The positive electrode of the battery can additionally comprise about 0.1 to about 5 weight percent electrically conductive agents and about 0.5 to about 7.9 weight percent polymer binder.

In some embodiments, the negative electrode of the battery can have a thickness from about 65 microns to about 200 microns on a single side of a current collector. The negative electrode of the battery can comprise graphite, synthetic graphite, hard carbon, graphite coated metal foil, coke or a combination thereof. The separator of the battery can comprise polyethylene, polypropylene, ceramic-polymer composites, or a combination thereof. Specifically, the separator can be a polyethylene-polypropylene-polyethylene tri-layer membrane. The electrically conductive material of the positive electrode can comprise graphite, carbon black, metal powders, metal fibers, or a combination thereof.

In general, a polymer binder can be used to adhere the powder together in the positive electrode as an integral structure. The polymer binder of the positive electrode can comprise polyvinylidine fluoride (PVDF), polyethylene oxide, polyethylene, polypropylene, polytetrafluoroethylene, polyacrylates, ethylene-(propylene-diene monomer) copolymer (EPDM) and mixtures and copolymers thereof. For PVDF binders, the polymer can have a molecular weight of at least about 800,000 AMU. The use of high molecular weight PVDF polymers has been found to provide for higher powder loadings into the positive electrode without adversely changing the performance of the battery while obtaining a mechanically stable electrode. In some commercial embodiments, the batteries generally comprise a plurality of electrodes separated by separator(s) such that the structure is stacked or rolled within a casing. The casing of the battery can be a polymeric film, a metallic foil, a metal can, or a combination thereof. The battery thus formed can be coin or button cell battery, cylindrical battery, prismatic battery or pouch cell battery.

The resultant battery generally can have a discharge energy density of at least about 240 Wh/kg when discharged from 4.6V to 2.0. In some embodiments, the resultant battery can have a discharge energy density of at least about 250 Wh/kg to 550 Wh/kg. In further embodiments, the battery can have a volumetric discharge energy density of at least about 550 Wh/l. In some embodiments, the resultant battery can have a volumetric discharge energy density of at least about 650 W11/1 to 1150 Wh/l.

The batteries described herein are lithium ion batteries generally using a non-aqueous electrolyte that comprises lithium ions. For secondary lithium ion batteries, lithium ions are released from the negative electrode during discharge such that the negative electrode functions as an anode during discharge with the generation of electrons from the oxidation of lithium upon its release from the electrode. Correspondingly, the positive electrode takes up lithium ions through intercalation or the like during discharge such that the positive electrode functions as a cathode which neutralizes the lithium ions with the consumption of electrons. Upon recharging of the secondary cell, the flow of lithium ions is reversed through the cell with the negative electrode taking up lithium and with the positive electrode releasing lithium as lithium ions.

Some of the positive electrode material compositions described herein have a low risk of fire for improved safety properties due to their specific compositions with a layered structure and reduced amounts of nickel relative to some other high capacity cathode materials. Also, these compositions use low amounts of elements that are less desirable from an environmental perspective, and can be produced from starting materials that have reasonable cost for commercial scale production.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. The batteries described herein that incorporate improved positive electrode active materials with respect to specific capacity and cycling can provide improved performance for consumers, especially for medium current applications.

Positive Electroactive Materials

The improved high energy batteries described herein generally incorporate positive electroactive materials with a large energy density relative to conventional materials. These materials can be prepared with suitable material properties, for example, tap density, such that the powders can be effectively assembled into batteries that have correspondingly high energies. Thus, appropriate improved positive electroactive materials have been discovered to be useful in producing the desirable batteries with the assembly processes described herein.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not change. However, the capacity of the active materials is observed to decrease with cycling to varying degrees. Thus, after a number of cycles, the performance of the cell falls below acceptable values, and the cell is replaced. Also, on the first cycle of the cell, generally there is an irreversible capacity loss that it significantly greater than per cycle capacity loss at subsequent cycles. The irreversible capacity loss is the difference between the charge capacity of the new cell and the first discharge capacity. To compensate for this first cycle irreversible capacity loss, extra electroactive material is included in the negative electrode such that the cell can be fully charged even though this lost capacity is not accessible during most of the life of the cell so that negative electrode material is essentially wasted.

The lithium ion batteries can use a positive electrode active material that is lithium rich relative to a reference homogenous electroactive lithium metal oxide composition. While not wanted to be limited by theory, it is believed that appropriately formed lithium-rich lithium metal oxides have a composite crystal structure in which, for example, a $Li_2MnO_3$ is structurally integrated with either a layered $LiMnO_2$ component or a spinel $LiMn_2O_4$ component or similar composite compositions with the manganese ions substituted with other transition metal ions with equivalent oxidation states. In some embodiments, the positive electrode material can be represented in two component notation as $xLiMO_2 \cdot (1-x)Li_2M'O_3$ where M is one or more of trivalent metal ions with at least one ion being $Mn^{+3}$, $Co^{+3}$, or $Ni^{+3}$ and where M' is one or more tetravalent metal ions and $0<x<1$. These compositions are described further in U.S. Pat. No. 6,677,082 to Thackeray et al. (the '082 Patent), entitled "Lithium Metal Oxide Electrodes for Lithium Cells and Batteries" and U.S. Pat. No. 6,680,143 to Thackeray et al. (the '143 Patent), entitled "Lithium Metal Oxide Electrodes for Lithium Cells and Batteries," both of which are incorporated herein by reference. Thackery identified Mn, Ti and Zr as being of particular interest as M' and Mn and Ni for M.

Batteries formed from these materials have been observed to cycle at higher voltages and with higher capacities relative to batteries formed with corresponding $LiMO_2$ compositions. In other embodiments, the layered lithium rich compositions can be represented in two component notation as $x Li_2MnO_3 \cdot (1-x)LiMn_{2-y}M_yO_4$, where M is one or more metal cations. These compositions are described further in published U.S. patent application 2006/0051673 to Johnson et al., entitled "Manganese Oxide Composite Electrodes for Lithium Batteries," incorporated herein by reference. The positive electrode materials with the composite crystal structure can exhibit high specific capacity that is above 200 milliamp hours per gram (mAh/g) at room temperature with good cycling properties.

The structure of some specific layered structures is described further in Thackery et al., "Comments on the structural complexity of lithium-rich $Li_{1+x}M_{1-x}O_2$ electrodes (M=Mn,Ni,Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials.

It has also been found that metal and fluorine dopants can influence the capacity, impedance and stability of the layered lithium metal oxide structures. These compositions with suitable metal and fluorine dopants can similarly be used in the batteries described herein. Some embodiments of these metal and halogen atom doped, e.g., fluorine doped, compositions are described further in U.S. Pat. No. 7,205,072 to Kang et al., entitled "Layered Cathode Materials for Lithium Ion Rechargeable Batteries," incorporated herein by reference. These metal and/or halogen atom doped variations on the layered lithium metal oxide structures can similarly be used in the high energy batteries described herein. It has been found that metal fluoride compositions can be successfully used to stabilize the cycling of high energy capacity compositions to maintain a discharge capacity of at least about 220 mAh/g for 10 or more discharge/recharge cycles.

Positive electrode active materials with an optional fluorine dopant can be described by the formula $Li_{1+x}Ni_\alpha Mn_\beta Co_\gamma M_\delta O_{2-z/2}F_z$, where x ranges from about 0.05 to about 0.25, α ranges from about 0.1 to about 0.4, β range from about 0.4 to about 0.65, γ ranges from about 0.05 to about 0.3, δ ranges from about 0 to about 0.1 and z ranges from about 0 to about 0.1, and where M is Mg, Zn, Al, Ga, B, Zr, Ti, Ca, Ce, Y, Nb or combinations thereof. The fluorine is a dopant that can contribute to cycling stability as well as improved safety of the materials. In embodiments in which z=0, this formula reduces to $Li_{1+x}Ni_\alpha Mn_\beta Co_\gamma M_\delta O_2$. It has been found that suitable coatings provide desirable improvements in cycling properties without the use of a fluorine dopant, although it may be desirable to have a fluorine dopant in some embodiments. Furthermore, in some embodiments it is desirable to have δ=0 such that the compositions are simpler while still providing improved performance. For these embodiments, if z=0 also, the formula simplifies to $Li_{1+x}Ni_\alpha Mn_\beta Co_\gamma O_2$, with the parameters outlined above. Compositions represented with the formula $Li_{1+x}Ni_\alpha Mn_\beta Co_\gamma O_2$ can be alternatively written in the two component notation referenced above. A person of ordinary skill in the art will recognize that additional ranges of parameter values within the explicit ranges above are contemplated and are within the present disclosure.

High specific capacities were obtained for this $Li_{1+x}Ni_\alpha Mn_\beta Co_\gamma M_\delta O_{2-z/2}F_z$ composition using synthesis approaches described in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials" and U.S. application Ser. No. 12/332,735 to Lopez et al. (the '735 application) entitled "Positive Electrode Material for High Specific Discharge Capacity Lithium Ion Batteries", both incorporated herein by reference. In particular, surprisingly good results have been obtained for $Li[Li_{0.2}Ni_{0.175}Co_{0.10}Mn_{0.525}]O_2$. A carbonate co-precipitation process described in the '735 application gave desired lithium rich metal oxide materials having cobalt in the composition and exhibiting the high specific capacity performance with superior tap density. These copending patent applications also describe the effective use of coatings to improve performance and cycling.

Appropriate coating materials can both improve the long term cycling performance of the material as well as decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al. (the '930 application), entitled "Cathode Active Material Coated with Fluorine Compound for Lithium Secondary Batteries and Method for Preparing the Same," incorporated herein by reference. This patent application provides results for $LiCoO_2$ coated with $LiF$, $ZnF_2$ or $AlF_3$. It has been discovered that metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The amount of coating material can be selected to accentuate the observed performance improvements.

In particular, the cycling properties of the batteries formed from the metal fluoride coated lithium metal oxide have been found to significantly improve from the uncoated material. Additionally, the overall capacity of the batteries also shows desirable properties with the fluoride coating, and the irreversible capacity loss of the first cycle of the battery is reduced. As discussed earlier, first cycle irreversible capacity loss of a battery is the difference between the charge capacity of the new battery and its first discharge capacity. The bulk of the first cycle irreversible capacity loss is generally attributed to the positive electrode material.

The coating provides an unexpected improvement in the performance of the high capacity lithium rich compositions used herein. In general, a selected metal fluoride or metalloid fluoride can be used for the coating. Similarly, a coating with a combination of metal and/or metalloid elements can be used. Metal/metalloid fluoride coatings have been proposed to stabilize the performance of positive electrode active materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in the '930 application to Sun et al. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}Co_{1/3}Mn_{1/3}O_2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference. A reduction in irreversible capacity loss was noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference.

It has been found that metal/metalloid fluoride coatings can significantly improve the performance of lithium rich layered compositions for lithium ion secondary batteries as demonstrated in the examples in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials" and U.S. Application Ser. No. 12/332,735 to Lopez et al. (the '735 application) entitled "Positive Electrode Material for High Specific Discharge Capacity Lithium Ion Batteries", both incorporated herein by reference. The coating improves the capacity of the batteries. However, the coating itself is not electrochemically active. When the loss of specific capacity due to the amount of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material. In general, the amount of coating material ranges from about 0.01 mole percent to about 10 mole percent, in further embodiments from about 0.1 mole percent to about 7 mole percent, in additional embodiments from about 0.2 mole percent to about 5 mole percent, and in other embodiments from about 0.5 mole percent to about 4 mole percent. A person of ordinary skill in the art will recognize that additional ranges of coating material within the explicit ranges above are contemplated and are within the present disclosure. The amount of $AlF_3$ effective in $AlF_3$ coated metal oxide materials to improve the capacity of the uncoated material is related to the particle size and surface area of the uncoated material. In particular, a higher mole percentage of metal fluoride coating generally can be used for a higher surface area powder to achieve an equivalent effect relative to a coating on a lower surface area powder.

The positive electrode active compositions can exhibit surprisingly high specific capacities in lithium ion cells under realistic discharge conditions. In some embodiments based on improved synthesis approaches, the lithium rich positive electrode active materials with the composite crystal structure can exhibit high specific capacity that is above 250 mAh/g at room temperature with good cycling properties for discharge from 4.6 volts. In some other embodiments, the lithium rich positive electrode active materials with the composite crystal structure used herein can exhibit high specific capacity that is above 235 mAh/g at room temperature with good cycling properties for discharge from 4.6 volts and high tap density above 1.8 g/mL. In general, when specific capacities are comparable, a higher tap density of a positive electrode material results in a higher overall capacity of a battery. It is noted that during charge/discharge measurements, the specific capacity of a material depends on the rate of discharge. The maximum capacity of a specific cell is measured at very slow discharge rates. In actual use, the actual capacity is less than the maximum due to discharge at a finite rate. More realistic capacities can be measured using reasonable rates of discharge that are more similar to the rates during use. For low to moderate rate applications, a reasonable testing rate involves a discharge of the cell over three hours. In conventional notation this is written as C/3 or 0.33 C. The positive electrode active materials used herein can have a specific discharge capacity of at least about 250 mAh/g at a discharge rate of C/3 at the tenth discharge/charge cycle at room temperature when discharged from 4.6 volts. In some embodiments, the positive electrode active materials used herein can have a specific discharge capacity of at least about 250 mAh/g at a discharge rate of C/10 at room temperature when discharged from 4.6 volts and tap density above 1.8 g/mL The greatest capacity performance in the lithium ion batteries has been obtained with coated materials.

The positive electrode material can synthesized generally by co-precipitation and sol-gel processes detailed in U.S. application Ser. No. 12/246,814 to Venkatachalam et al. (the '814 application) entitled "Positive Electrode Material for Lithium Ion Batteries Having a High Specific Discharge Capacity and Processes for the Synthesis of these Materials" and U.S. application Ser. No. 12/332,735 to Lopez et al. (the '735 application) entitled "Positive Electrode Material for High Specific Discharge Capacity Lithium Ion Batteries", both incorporated herein by reference. In some embodiments, the positive electrode material is synthesized by precipitating a mixed metal hydroxide or carbonate composition from a solution comprising +2 cations wherein the hydroxide or carbonate composition has a selected composition. The metal hydroxide or carbonate precipitates are then subjected to heat treatment etc. to form a crystalline layered lithium metal oxide composition.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, LiOH, $Li_2CO_3$, or a combination thereof, can be mixed with the precipitated metal hydroxide or carbonate. The powder mixture is then advanced through the heating step(s) to form the oxide and then the crystalline positive electrode material.

The fluoride coating of the positive electrode material can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired amount of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

Battery Cell Design

In the improved batteries herein, high energy positive electrode materials described above are effectively incorporated into the batteries to achieve extremely high performance values. In particular, the ability to synthesize high energy density electroactive materials with a high tap density has been found to allow for positive electrodes at high active material loadings. It has also been found that high molecular weight polymers allow for the formation of electrodes with low amounts of polymers without compromising the mechanical stability of the electrodes or the electrode performance. Based on these important advances, batteries can be formed having very high energy densities as well as high volumetric energies.

A schematic diagram of a battery without a casing is shown in FIG. 1. Specifically a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. Alternatively, the electrodes and separators can be jelly-rolled or folded into different configurations before enclosed in a casing.

Commercial cells are generally designed to have an excess capacity in the negative electrode relative to the positive electrode so that the cells are not limited by the anode during discharge and so that lithium metal does not plate out on the negative electrode during recharge of the cell. Lithium metal can cause cycling problems as well as safety concerns due to the reactivity of the lithium metal. To achieve the desired high energy for the cell, the negative electrode structure can be made thicker so that the negative electrode can provide the appropriate capacity in view of very high positive electrode capacities.

The high energy batteries described herein can have a negative electrode formed, for example, with conventional lithium intercalating carbon materials. Suitable negative electrode active materials include, for example, lithium intercalating carbons, some metal alloys, some silicon materials and some metal oxides. A separator is placed between the positive electrode and the negative electrode. The electrode stack is contacted with an electrolyte comprising lithium ions and generally a non-aqueous liquid. The electrode stack and electrolyte are sealed within a suitable container.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, hard carbon, mesophase carbon, appropriate carbon blacks, coke, fullerenes, niobium pentoxide, intermetallic alloys, silicon alloys, tin alloys, silicon, titanium oxide, tin oxide, and lithium titanium oxide, such as $Li_xTiO_2$, $0.5<x\leq1$ or $Li_{1+x}Ti_{2-x}O_4$, $0\leq x\leq\frac{1}{3}$. Hard carbon suitable for use in negative electrodes is described further in U.S. patent application 2003/0157014A to Wang et al., entitled "Pyrolyzed Hard Carbon Material, Preparation and its Applications," incorporated herein by reference. Alloy based anodes are described further, for example, in U.S. Pat. No. 6,730,429 to Thackeray et al, entitled "Intermetallic Negative Electrodes for Non-Aqueous Lithium Cells and Batteries," published U.S. patent application 2007/0148544A1 to Le, entitled "Silicon-Containing Alloys Useful as Electrodes for Lithium-Ion Batteries," and U.S. Pat. No. 7,229,717 to Yamaguchi et al., entitled "Anode Active Material and Battery Using it," all three of which are incorporated herein by reference. The metal alloys can be combined with intercalation carbons and/or conductive carbon. The negative electrode active materials can be combined with a polymer binder and associated with a current collector to form the negative electrode. Similarly, other appropriate electroactive negative electrode compositions can be used that provide appropriate discharge voltages with desired cycling capability. Additional negative electrode materials are described in copending provisional patent applications Ser. No. 61/002,619 to Kumar, entitled "Inter-metallic Compositions, Negative Electrodes With Inter-Metallic Compositions and Batteries," and Ser. No. 61/125,476 to Kumar et al., entitled "Lithium Ion Batteries With Particular Negative Electrode Compositions," both of which are incorporated herein by reference. In some embodiments, the negative electrodes can have a thickness on each side of the current collector following compression of the anode material from 65 microns to 200 microns and in further embodiments from 75 microns to 150 microns. In some embodiments, the anode has a density of from about 1.5 to 1.7 g/mL. A person of ordinary skill in the art will recognize that additional ranges of electrode thickness within the explicit ranges above are contemplated and are within the present disclosure.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride (PVDF), polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof and mixtures thereof. The positive electrode active material loading in the binder can be large, such as greater than about 80 weight percent. These high loadings of positive electrode active material powders within the positive electrode can be formed with a more desirable and reproducible degree of mechanical stability using polymers with a high molecular weight. In particular, in some embodiments, PVDF polymer binders have an average molecular weight of at least about 800,000 atomic mass units (AMU), in further embodiments at least about 850,000 AMU, in further embodiments at least about 900,000 AMU and in additional embodiments from about 1,000,000 AMU to 5,000,000 AMU. A person of ordinary skill in the art will recognize that additional ranges of composition within the explicit ranges above are contemplated and are within the present disclosure. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof.

The electrode generally is associated with an electrically conductive current collector to facilitate the flow of electrons between the electrode and an exterior circuit. The current collector can comprise metal, such as a metal foil, a metal grid or screen, or expanded metal. Expanded metal current collectors refer to metal grids with a greater thickness such that a greater amount of electrode material is placed within the metal grid. In some embodiments, the current collector can be formed from nickel, aluminum, stainless steel, copper or the like. The electrode material can be cast in contact with the current collector. For example, in some embodiments, the electrode material in contact with the current collector foil or other structure can be subjected to a pressure from about 2 to about 10 kg/cm² (kilograms per square centimeter). The pressed structure can be dried, for example in an oven, to remove the solvent from the electrode. Metal foils can be used as current collectors. For example, copper foils can be used as current collectors for negative electrodes and aluminum foil can be used as positive electrode current collectors. Pastes or slurries of the cathode materials can be coated onto both sides of the foil. Then, the electrodes can be pressed using calendering rolls, a press with a die or other suitable processing apparatus to compress the electrodes to a desired thickness. The positive electrodes can have an active material particle loading on each side of the current collector from 20 mg/cm² to 50 mg/cm². The positive electrodes can have a density of at least 2.5 grams per milliliter (g/mL), in further embodiments at least about 2.8 g/ml and in additional embodiments from about 3.0 g/mL to about 3.5 g/mL. A person of ordinary skill in the art will recognize that additional ranges of active material loading within the explicit range above are contemplated and are within the present disclosure.

The separator is located between the positive electrode and the negative electrode. The separator is electrically insulating while providing for at least selected ion conduction between the two electrodes. A variety of materials can be used as separators. For example, glass fibers formed into a porous mat can be used as a separator. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Suitable separator materials include, for example, 12 micron to 40 micron thick trilayer polypropylene-polyethylene-polypropylene sheets, such as Celgard® M824, which has a thickness of 12 microns. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride and combinations thereof Traditionally, the electrolyte comprises a 1 M concentration of the lithium salts. In some embodiments, conventional electrolyte compositions can be used, such as a 1 molar solution of $LiPF_6$ in a blend of ethylene carbonate and dimethylcarbonate at a 1 to 1 by volume ratio. In some particular embodiments, solid electrolyte can be used, which generally also functions as the separator for electrodes. Solid electrolytes are described further, for example, in U.S. Pat. No. 7,273,682 to Park et al., entitled "Solid Electrolyte, Method for Preparing the Same, and Battery Using the Same," incorporated herein by reference.

For lithium ion batteries of interest, a non-aqueous liquid is generally used to dissolve the lithium salt(s). The solvent is generally inert and does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme(tri(ethylene glycol)dimethyl ether), diglyme(diethylene glycol dimethyl ether), DME (glyme or 1,2-dimethyloxyethane or ethylene glycol dimethyl ether), nitromethane and mixtures thereof.

The electrodes described herein can be incorporated into various commercial cell designs. For example, the cathode compositions can be used for prismatic shaped cells, wound cylindrical cells, coin cells, pouch cells or other reasonable cell shapes. The testing in the Examples is performed using coin cells and pouch cells. The cells can comprise a single positive electrode structure or a stacked structure with a plurality of positive electrodes assembled in parallel and/or series electrical connection(s). In particular, the battery can comprise a stack of alternating positive electrodes and negative electrodes with separators between them. Generally, the plurality of electrodes is connected in parallel to increase the current at the voltage established by a pair of a positive electrode and a negative electrode. While the positive electrode active materials can be used in batteries for primary, or single charge use, the resulting batteries generally have desirable cycling properties for secondary battery use over multiple cycling of the cells.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors and the resulting jellyroll structure can be placed into a metal canister or polymer package, with the negative tab and positive tab welded to appropriate external contacts. Electrolyte is added to the canister, and the canister or package is sealed to complete the battery.

Some presently used rechargeable commercial cells include, for example, the cylindrical 18650 cells (18 mm in diameter and 65 mm long) and 26700 cells (26 mm in diameter and 70 mm long), although other cell sizes can be used. Cylindrical cell is a widely used battery packaging format. The cylindrical shape of the cell has the ability to withstand high internal and external pressure. Additionally, cylindrical cells can have a venting mechanism to release excessive internal pressure. Because of its cylindrical shape and fixed sizes, however, cylindrical battery cell generally has poor space utilization and has to be designed around available cell sizes. In a cylindrical cell, the electrodes and separators can be made into long thin sheets and rolled into a spiral or jelly-roll shape optionally around a rod shaped positive terminal. Alternatively, the electrodes can be wound onto a flat mandrel to provide flattened shaped that can fit inside a prismatic case to make a prismatic cell. Electrodes can alternatively or additionally be stacked within a prismatic shaped cell.

Prismatic cells come in various sizes that can be custom-made to meet different size and energy demands. One version of a prismatic cell is referred to as a pouch cell, which generally has a heat-sealable foil to enclose rolled or stacked electrodes and separators as an alternative to a metal can. Pouch cell battery format generally allows tailoring to exact cell dimensions and makes the most efficient use of available space and can sometimes achieve a packaging efficiency of 90 to 95 percent, the highest among battery packs. Because of the absence of a metal can, the pouch cells are generally light. Prismatic and pouch cell formats can contains a plurality of positive electrode sheets and negative electrode sheets that are sandwiched together in layers with separators in-between.

To achieve the very high energies for the cells described herein, the positive electrode designs generally comprise the high capacity cathode electroactive compositions described above. However, the positive electrodes generally also involve a high loading of the electroactive materials into the electrode with corresponding decreases in electrically conductive powders and binder. The electrode should have appropriate cohesiveness at the high particle loadings. This can be accomplished with appropriate selection of the polymer binder, such as using a high molecular weight binder and/or a rubber polymer.

In some particular embodiments, the positive electrode can comprise from about 90 to about 99 weight percent active material, in further embodiments from about 92 to 98 weight percent, in additional embodiments from about 92. to about 97.5 weight percent and in other embodiments from about 92.5 to about 97 weight percent active material. Similarly, the positive electrode can comprise from about 0.1 to about 8 weight percent supplemental electrically conductive agent, in further embodiments from about 0.5 to about 6 weight percent electrically conductive agent and in additional embodiments form about 1 to about 5 weight percent electrically conductive agent. In addition, the positive electrode can comprise from about 0.5 to about 8 weight percent polymer binder, in further embodiments from about 1.0 to about 6 weight percent polymer binder and in additional embodiments form about 1.5 to about 5 weight percent polymer binder. A person of ordinary skill in the art will recognize that additional ranges of amounts of positive electrode compositions within the explicit ranges above are contemplated and are within the present disclosure. Suitable conductive agents include, for example, graphite powder, carbon black, combinations thereof and the like.

The batteries described herein are formed with active materials that provide for a high degree of safety. Commercial lithium ion batteries have suffered from safety concerns due to occasions of batteries catching fire. In contrast with commercial cells having relatively high energy capacity, the cells described herein are based on materials that do not have corresponding instabilities so that the present cells do not exhibit thermal run away. If the cells described herein are heated, they do not spontaneously react to catch fire. Relatively high energy commercial lithium ion cells exhibit thermal runaway in which the heated cells undergo reaction and catch fire. Thus, the cells herein provide improved energy capacity as well as providing increased safety during use.

Improved Cell Performance

As noted above, the positive electrode electroactive materials can have a high energy capacity, generally at least about 200 milliampere hours/gram (mAh/g), in some embodiments at least about 225 mAh/g, and in further embodiments at least about 250 mAh/g, with good cycling. With the cells designs described herein, the batteries can have a total energy density of at least about 240 Watt-hours/kilogram (Wh/kg), in further embodiments from about 250 to 550 Wh/kg, in some embodiments from about 280 to 500 Wh/kg and in further embodiments from about 300 to 450 Wh/kg, in a desired shape and sized battery. Alternatively, when measured in volumetric terms, the batteries can have a total volumetric energy density of at least about 550 Watt-hours/liter (Wh/l), in further embodiments from about 650 to 1150 Wh/l, in some embodiments from about 675 to 1050 Wh/l and in further embodiments from about 700 to 1000 Wh/l, in a desired shape and sized battery. The volume of a battery can be evaluated for example as the cross sectional area of the cell canister times the length of the cell canister, or as the length times the width and the thickness of the battery cell. A person of ordinary skill in the art will recognize that additional ranges of battery capacities within the explicit ranges above are contemplated and are within the present disclosure.

In contrast with the present cell designs, U.S. Pat. Nos. 7,201,997 and 7,166,385 both to Ishida et al., both incorporated herein by reference, describe details involving electrode thickness versus energy density, cycle life and rate capability in the context of lithium ion batteries with high energy density active materials. Both anode and cathode thickness is varied from 60 to 360 micron and the data shows significant decrease in cycle life and rate capability as electrode thickness increase. These cell designs incorporated conventional positive electrode active materials. These patents do not report performances levels achieved herein. In the cells described herein, the positive electrodes can be thinner while providing high energies through the use of higher capacity active materials as well as using higher loadings of active materials.

In general, various similar testing procedures can be used to evaluate the battery performance. A specific testing procedure is described for the evaluation of the performance values described herein. The testing procedure is described in more detail in the examples below. Specifically, the battery can be cycled between 4.6 volts and 2.0 volts at room temperature, although other ranges can be used with correspondingly different results. The evaluation over the range from 4.6 volts to 2.0 volts is desirable for commercial use since the batteries generally have stable cycling over this voltage range. For the first three cycles, a battery is discharged at a rate of C/10 to establish irreversible capacity loss. The battery is then cycled for three cycles at C/5. For cycle 7 and beyond, the battery is cycled at a rate of C/3, which is a reasonable testing rate for medium current applications. Again, the notation C/x implies that the battery is discharged at a rate to fully discharge the battery to the selected lower voltage cut off in x hours. The battery capacity generally depends significantly on the discharge rate, with lose of capacity as the discharge rate increases.

In some embodiments, the positive electrode active material has a specific capacity during the tenth cycle at a discharge rate of C/3 of at least about 235 milliamp hours per gram (mAh/g), in additional embodiments from about 240 mAh/g to about 310 mAh/g, in further embodiments from about 245 mAh/g to about 300 mAh/g and in other embodiment from about 250 mAh/g to about 290 mAh/g. Additionally, the $20^{th}$ cycle discharge capacity of the material is at least about 98%, and in further embodiments 98.5% of the $5^{th}$ cycle discharge capacity, cycled at a discharge rate of C/3. It has been found that the first cycle irreversible capacity loss for metal fluoride coated electroactive materials can be decreased at least about 25%, and in further embodiments from about 30% to about 60% relative to the equivalent performance of the uncoated materials. The tap density of the material can be at least about 1.8 g/mL, in further embodiments from about 2 to about 3.5 g/mL and in additional embodiments from about 2.05 to about 2.75 g/mL. High tap density translates into high overall capacity of a battery given a fixed volume. A person of ordinary skill in the art will recognize that additional ranges of specific capacity and tap density and of decreases in irreversible capacity loss are contemplated and are within the present disclosure. For fixed volume applications such as batteries for electronic devices, high tap density therefore high overall capacity of the battery is of particular significance.

Generally, tap density is the apparent powder density obtained under stated conditions of tapping. The apparent density of a powder depends on how closely individual particles of the powder are pack together. The apparent density is affected not only by the true density of the solids, but by the particle size distribution, particle shape and cohesiveness. Handling or vibration of powdered material can overcome some of the cohesive forces and allow particles to move relative to one another so smaller particles can work their way into the spaces between the larger particles. Consequently, the total volume occupied by the powder decreases and its density increases. Ultimately no further natural particle packing can be measured without the addition of pressure and an upper limit of particle packing has been achieved. While electrodes are formed with the addition of pressure, a reasonably amount of pressure is only effective to form a certain packing density of the electroactive materials in the battery electrode. The actual density in the electrode generally relates to the tap density measured for a powder so that the tap density measurements are predictive of the packing density in a battery electrode with a higher tap density corresponding to a higher packing density in the battery electrode.

EXAMPLES

Batteries of different packaging (for example, coin cell versus pouch cell) were constructed and tested in Examples 1-3. The resulting batteries were tested with a Maccor cycle tester to obtain charge-discharge curve and cycling stability over a number of cycles.

Example 1

Cathode Capacity Determined from Coin Cell Battery Measurements

This example demonstrates the high energy density that is available from a battery having a positive electrode formed with high loading of an active material. The active material has a high energy capacity as well as particle properties that provide for a high loading into the electrode.

The positive electrode was formed with cathode powders having the chemical formula $Li[Li_{0.2}Ni_{0.175}Co_{0.10}Mn_{0.525}]O_{2.0}$ and a surface coating of aluminum fluoride. The material was synthesized as described in the example of the '735 application. Cathode powders were mixed with conductive carbon in a jar mill for a few hours. The resulting powder was mixed with PVDF and N-methyl pyrrolidone (NMP) solution using a magnetic stirrer to faun an homogeneous slurry. The PVDF had an average molecular weight of 1 million atomic mass unit (AMU). The slurry was coated on an aluminum foil to desired thickness and then vacuum dried. The dried coated foil was compressed to desired thickness, and electrodes were punched out of the coated foil for fabricating coin cell batteries. The electrode thus formed comprises 94.25 weight % cathode powder, 3 weight % conductive carbon and 2.75 weight % PVDF binder. The electrode had an active cathode material loading level of 18.1 $mg/cm^2$ and a density of 3.0 g/mL. In general if equivalent electroactive powders and electrically conductive carbon was processed with a PVDF polymer having a molecular weight significantly lower than 1 million AMU, the resulting structure had poor performance and difficulties for assembly related to insufficient adhesion and cohesion of the electrode materials.

Figure 2:
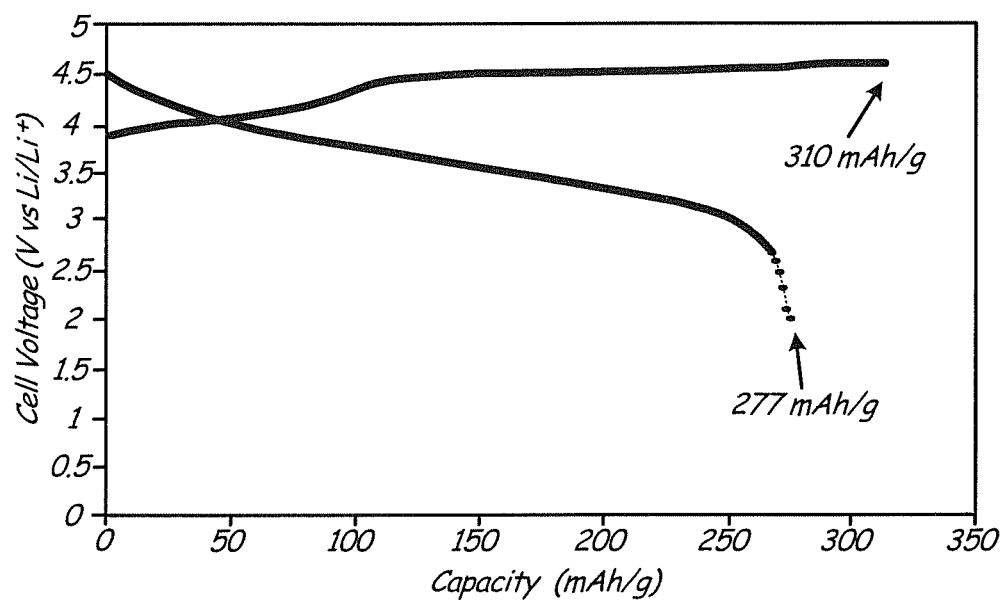
FIG. 2 is a plot of first cycle charge/discharge voltage versus specific capacities of a battery described in example 1 cycled at a discharge rate of C/10 in the voltage range of 2.0-4.6V.
Figure 3:
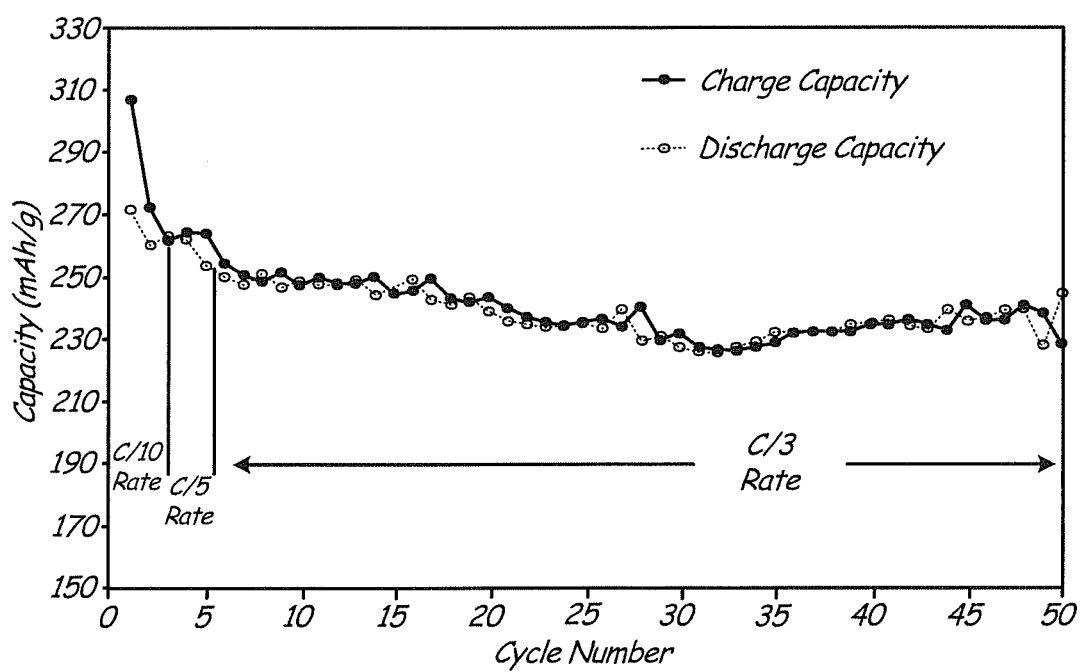
FIG. 3 is a plot of specific capacity versus cycle life for the battery of FIG. 2 showing variation of the discharge capacities as function of cycle number.

Coin cell batteries were assembled in argon filled dry box using 1M $LiPF_6$. Lithium foil was used as the negative electrode and a commercial separator material was placed between the positive and negative electrodes. The battery cells were cycled at room temperature at a C/10 rate. i.e., a rate the battery cell is discharged in 10 hours. The performance of the battery cell was tested with a Maccor™ battery cell tester. FIG. 2 shows the charge and discharge capacities of the first charge-discharge cycle of the coin cell battery. As shown in FIG. 2, the cathode material exhibited an initial charge capacity of 310 mAh/g and a discharge capacity of 277 mAh/g. The battery cells were cycled between 4.6V to 2.0 V at various rates. FIG. 3 shows cycling stability of the battery cell measured up to 50 cycles. For the first three cycles, the battery is discharged at a rate of C/10 to establish irreversible capacity loss. The battery is then cycled for three cycles at C/5. For cycle 7 and beyond, the battery is cycled at a rate of C/3, which is a reasonable testing rate for medium current applications. Again, the notation C/x implies that the battery is discharged at a rate to fully discharge the battery to the selected lower cutoff in the voltage in x hours.

Example 2

Cathode Capacity Determined from Another Coin Cell Battery Measurements

This example demonstrates the high energy capacity that is available in a coin cell battery with an anode comprising a lithium intercalation material. The coin cell has a positive electrode formed with high loading of an active cathode material.

Positive electrode was formed using cathode powders having the chemical formula $Li[Li_{0.2}N_{0.175}Co_{0.10}Mn_{0.525}]O_{2.0}$ and a surface coating of aluminum fluoride. Cathode powders were mixed with conductive carbon in a jar mill for a few hours. The resulting powder was mixed with PVDF and N-methyl pyrrolidone (NMP) solution using a magnetic stirrer to form homogeneous slurry. The PVDF used has an average molecular weight of 1 million AMU. The slurry was coated on an aluminum foil to desired thickness and then vacuum dried. The dried coated foil was compressed to desired thickness and electrodes were punched out of the coated foil for fabricating the coin cell batteries. The electrode thus formed comprises 94.25 weight % cathode powder, 3 weight % conductive carbon and 2.75 weight % PVDF binder. The electrode has an active cathode material loading level of 20.2 mg/cm$^2$.

Figure 4:
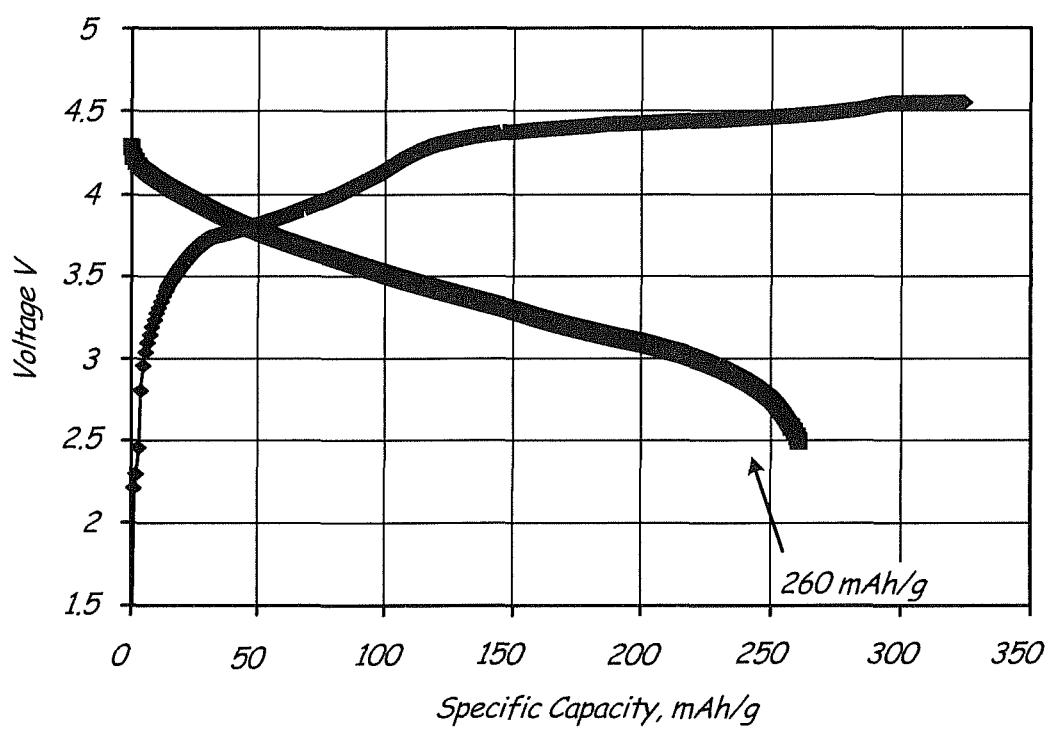
FIG. 4 is a plot of first cycle charge/discharge voltage versus specific capacities of a coin cell battery described in example 2 cycled at a discharge rate of C/10 in the voltage range of 2.0-4.6V.

Coin cell batteries were assembled in argon filled dry box using 1M LiPF$_6$. A graphitic carbon coated onto copper foil was used as the negative electrode, and a trilayer (polypropylene/polyethylene/polypropylene) micro-porous separator (2320 from Celgard, LLC, NC, USA) was placed between the positive and the negative electrodes. The battery cells were cycled at room temperature at a C/10 rate. i.e. a rate at which the battery cell is discharged and charged in 10 hours. The performance of the cell battery was tested with a Maccor™ battery cell tester. FIG. 4 shows charge-discharge capacity of the coin cell batteries between 4.55V charge and 2.5V discharge cut-off. As shown in FIG. 4, the cathode material exhibited a discharge capacity of 260 mAh/g over the cycle range shown, in which the discharge rates were varied for the later cycles as described in Example 1.

Example 3

Cathode Capacity Determined from Pouch Cell Battery Measurements

Figure 5A:
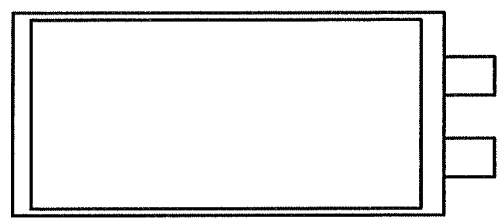
FIG. 5a is a photo of the front of the pouch cell battery constructed in Example 3.
Figure 5B:
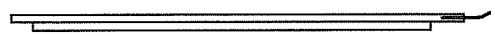
FIG. 5b is a photo of the side of the pouch cell battery constructed in Example 3.
Figure 5C:
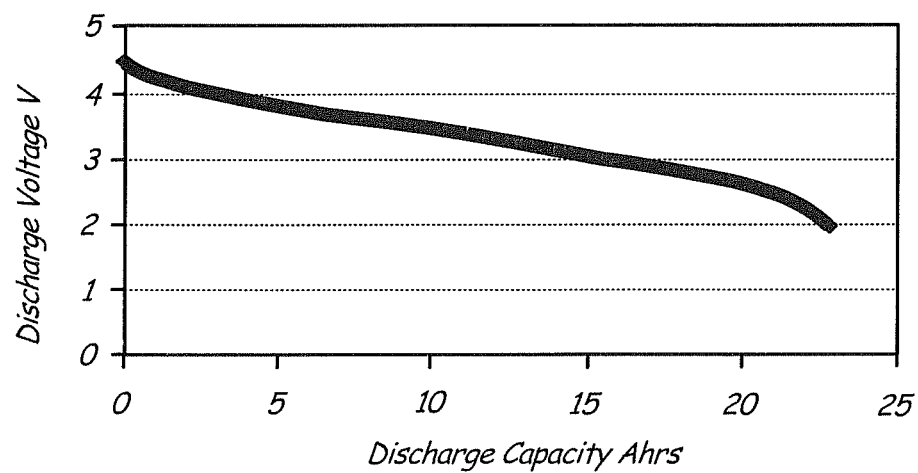
FIG. 5c is a discharge curve of the pouch cell battery constructed in Example 3.

This example demonstrates the high energy capacity that is available in a pouch cell battery formed with high loading of an active cathode material. A pouch cell battery with dimensions 190 mm×95 mm×8 mm (volume=0.144 L) was constructed and tested following the same construction and testing approaches outlined in example 2, with adaptations to suite the pouch cell battery with a stack of electrodes separated with separators. The positive electrodes are connected in parallel, and the negative electrodes are similarly connected in parallel. FIG. 5a shows a photo of the front of the pouch cell battery. FIG. 5b shows a photo of the side of the pouch cell battery. FIG. 5c shows a discharge curve of the pouch cell battery having 23 Ah and energy density of 250 Wh/kg.

Data presented in Examples 1 and 2 above demonstrated cathode capacity of 277 mAh/g using a lithium anode and cathode capacity of 260 mAh/g using a carbon anode at C/10 cycling rates, respectively. Positive electrodes discussed herein were shown to support a 25 Ampere-hour practical battery design, and the data is shown in tables 1 and 2. The volumetric energy density of the batteries ranged from 550-650 Wh/l at a C/10 cycling rate. As a comparison, performance results using commercial LiCoO$_2$ is shown yielding 425-525 Wh/l at a C/10 cycling rate when employed with the same electrode porosity as the cathodes in the Examples.

TABLE 1

| Binder | Cathode | Volumetric Energy Density (Wh/l)[a] | |
| --- | --- | --- | --- |
| BMW, kDa | Active % | $Li[Li_{0.2}Ni_{0.175}Co_{0.10}Mn_{0.525}]O_{2.0}$ | LiCoO$_2$ |
| 300 | 80-88 | 350-450 | 225-325 |
| 600 | 89-92 | 475-525 | 350-400 |
| 1000 | 93-97 | 550-650 | 425-525 |

[a] energy density is measure with 25 Ah cell cycled at C/10 cycling rate

TABLE 2

| Binder | Cathode | Discharge Energy Density (Wh/kg) | |
| --- | --- | --- | --- |
| BMW, kDa | Active % | $Li[Li_{0.2}Ni_{0.175}Co_{0.10}Mn_{0.525}]O_{2.0}$ | LiCoO$_2$ |
| 300 | 80-88 | 140-170 | 120-140 |
| 600 | 89-92 | 175-235 | 150-170 |
| 1000 | 93-97 | 240-320 | 180-210 |

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A lithium ion secondary battery comprising a positive electrode comprising a first lithium rich lithium intercalation composition, which is lithium rich relative to a LiMO$_2$ reference composition with M representing non-lithium metal elements, a negative electrode comprising a second lithium intercalating composition, and a separator between the positive electrode and the negative electrode, wherein the positive electrode comprises at least about 92 weight percent of the first lithium rich lithium intercalation composition, about 0.1 to 5 weight percent electrically conductive agents, about 0.5 to 7.9 weight percent polymer binder comprising polyvinylidene fluoride (PVDF), and a first current collector;

wherein the polymer binder has an average molecular weight of at least about 800,000 atomic mass units;

wherein the density of the positive electrode is at least about 2.5 g/ml;

wherein the first lithium rich lithium intercalation composition has a specific capacity of at least about 200 mAh/g when discharged from 4.6V to 2.0V at a rate of C/3 and a 20th cycle discharge capacity that is at least about 98% of the 5th cycle discharge capacity when cycled between 4.6V to 2.0V at a discharge rate of C/3; and wherein the first lithium intercalation composition is approximately represented by a formula of $xLiMO_2 \cdot (1-x)Li_2M'O_3$ where M is one or more trivalent metal ions with at least one metal being $Mn^{+3}$, $Co^{+3}$, or $Ni^{+3}$ and M' represents one or more metal ions having an average valence of +4 and 0<x<1, a formula $Li_{1+x}Ni_\alpha Mn_\beta Co_\gamma M''_\delta O_{2-z/2}F_z$ where x ranges from about 0.05 to about 0.25, α ranges from about 0.1 to about 0.4, β ranges from about 0.4 to about 0.65, γ ranges from about 0.05 to about 0.3, δ ranges from about 0 to about 0.1 and z ranges from about 0 to about 0.1 and where M" is Mg, Zn, Al, Ga, B, Zr, Ti, Ca, Ce, Y, Nb or combinations thereof, or both.

2. The lithium ion secondary battery of claim 1 wherein the battery has a discharge energy density of at least about 240 Wh/kg when discharged from 4.6V to 2.0V.

3. The lithium ion secondary battery of claim 1 wherein the first lithium intercalation composition is represented by a formula of $xLiMO_2 \cdot (1-x)Li_2M'O_3$ where M is one or more trivalent metal ion with at least one metal ion being $Mn^{+3}$, $Co^{+3}$, or $Ni^{+3}$ and M' represents one or more metal ions having an average valance of +4 and $0<x<1$.

4. The lithium ion secondary battery of claim 1 wherein the first lithium intercalation composition comprises from about 0.1 mole percent to about 10 mole percent metal fluoride as a coating.

5. The lithium ion secondary battery of claim 4 wherein the metal fluoride comprises $AlF_3$.

6. The lithium ion secondary battery of claim 1 further comprising a second current collector and wherein the negative electrode has a thickness from about 65 microns to about 200 microns on a single side of the second current collector.

7. The lithium ion secondary battery of claim 1 wherein the battery has a discharge energy density of at least about 250 Wh/kg to 550 Wh/kg, and an active material loading on each side of the first current collector from about 20 mg/cm$^2$ to about 50 mg/cm$^2$.

8. The lithium ion secondary battery of claim 1 wherein the battery has a volumetric discharge energy density of at least about 550 Wh/l.

9. The lithium ion secondary battery of claim 1 wherein the first lithium intercalation composition is represented by a formula $Li_{1+x}Ni_\alpha Mn_\beta Co_\gamma O_2$, where x ranges from about 0.05 to about 0.25, $\alpha$ ranges from about 0.1 to about 0.4, $\beta$ ranges from about 0.4 to about 0.65, and $\gamma$ ranges from about 0.05 to about 0.3.

10. The lithium ion secondary battery of claim 9 wherein the battery comprises a plurality of electrodes with each polarity separated by separators within a casing and wherein electrodes and separators are stacked, jelly-rolled, or folded inside the casing.

11. The lithium ion secondary battery of claim 10 wherein the casing comprises a polymeric film, a metallic foil, or a combination thereof, and wherein the casing is prismatic in shape.

12. The lithium ion secondary battery of claim 1 wherein the first lithium intercalation composition is represented by a formula $Li_{1+x}Ni_\alpha Mn_\beta Co_\gamma M''_\delta O_{2-z/2}F_z$, where x ranges from about 0.05 to about 0.25, $\alpha$ ranges from about 0.1 to about 0.4, $\beta$ ranges from about 0.4 to about 0.65, $\gamma$ ranges from about 0.05 to about 0.3, $\delta$ ranges from about 0 to about 0.1 and z ranges from about 0 to about 0.1, and where M'' is Mg, Zn, Al, Ga, B, Zr, Ti, Ca, Ce, Y, Nb or combinations thereof.

13. The lithium ion secondary battery of claim 1 wherein the negative electrode comprises graphite, synthetic graphite, hard carbon, graphite coated metal foil, coke or a combination thereof.

14. The lithium ion secondary battery of claim 1 wherein the separator comprises polyethylene, polypropylene, ceramic-polymer composites, or a combination thereof.

15. The lithium ion secondary battery of claim 1 wherein the separator comprises a polyethylene-polypropylene-polyethylene tri-layer membrane.

16. The lithium ion secondary battery of claim 1 wherein the electrically conductive material comprises graphite, carbon black, metal powders, metal fibers, or a combination thereof.

17. The lithium ion secondary battery of claim 1 wherein the positive electrode active material has a specific capacity of at least about 225 mAh/g at the 10$^{th}$ cycle when discharged from 4.6V.

18. The lithium ion secondary battery of claim 1 wherein the positive electrode comprises from about 1.0 to about 6 weight percent polymer binder.

19. The lithium ion secondary battery of claim 1 wherein the polymer binder has an average molecular weight from about 1,000,000 atomic mass units to 5,000,000 atomic mass units.

* * * * *